United States Patent [19]

Einhaus

[11] Patent Number: 4,524,438
[45] Date of Patent: Jun. 18, 1985

[54] RECORD PLAYER WITH HINGED DUST COVER

[75] Inventor: Hermanus F. Einhaus, Eindhoven, Netherlands

[73] Assignee: U.S. Philips Corporation, New York, N.Y.

[21] Appl. No.: 590,127

[22] Filed: Mar. 16, 1984

[30] Foreign Application Priority Data

Mar. 17, 1983 [NL] Netherlands ............... 8300959

[51] Int. Cl.³ ............... E05D 11/08; G11B 17/04
[52] U.S. Cl. ............... 369/75.1; 16/306; 16/308; 16/386; 16/DIG. 36; 220/335; 369/292
[58] Field of Search ............... 369/75.1, 75.2, 210, 369/270, 271, 292; 16/304, 305, 306, 307, 223, 256, 289, 342, 347, 285, 295, 364, 373, 308, 380, DIG. 36, 386; 220/335, 334–341

[56] References Cited

U.S. PATENT DOCUMENTS

| 2,557,048 | 6/1951 | Haase | 16/295 |
| 2,624,642 | 1/1953 | Blattner | 220/335 |
| 3,127,048 | 3/1964 | Winter | 220/337 |
| 4,193,164 | 3/1980 | Okayama | 16/307 |
| 4,356,594 | 11/1982 | Grosemans | 16/289 |
| 4,424,606 | 1/1984 | Sorimachi | 369/75.1 |
| 4,437,178 | 3/1984 | Miyoshi et al. | 369/75.1 |

FOREIGN PATENT DOCUMENTS 256703  3/1949  Switzerland ............... 220/335

Primary Examiner—Steven L. Stephan
Attorney, Agent, or Firm—David R. Treacy

[57] ABSTRACT

In a record player comprising a housing and a hinged dust cover, a hinge device is formed by a hinge wall and an abutment which are integral with the housing and spaced from each other. An end portion of a first limb of a hinge coil spring acts against the abutment to urge turns of the hinge spring against the hinge wall. A second limb of the hinge spring projects through a slot in the housing and is coupled directly to the dust cover.

11 Claims, 5 Drawing Figures

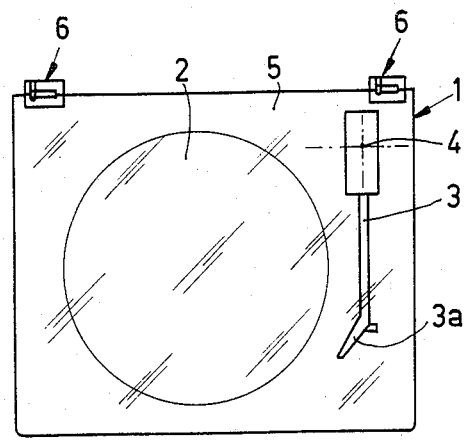
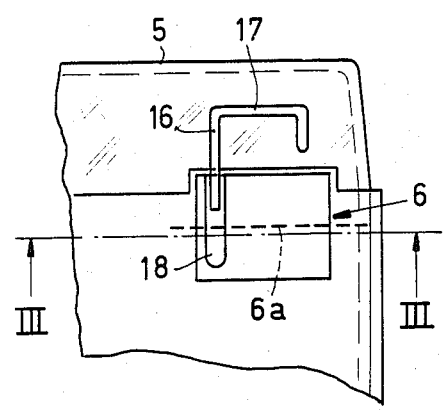
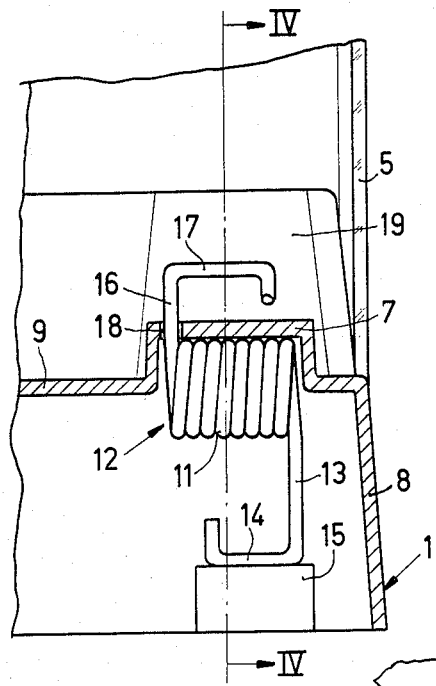
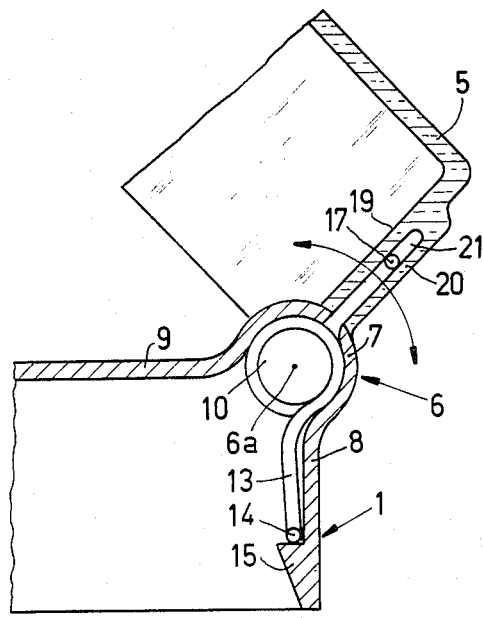
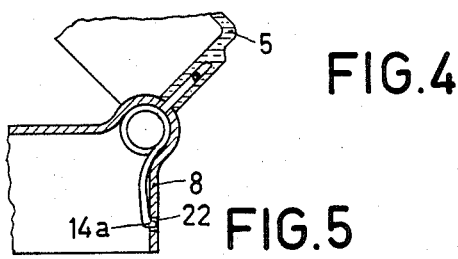
FIG.1
FIG.2
FIG.3
FIG.4
FIG.5

RECORD PLAYER WITH HINGED DUST COVER

BACKGROUND OF THE INVENTION

The invention relates to a record player comprising a housing, a dust cover, and at least one hinge device near the rear side connecting the cover to the housing, which hinge device is provided with a hinge spring which, after the cover has been moved to an open position, retains the cover in this position.

A record player of this type is disclosed in U.S. Pat. No. 4,356,594. In this known record player the hinge device comprises a support which is secured to the rear of the housing, a limb of the hinge spring acting against the housing and the turns of the hinge spring coil being arranged around a first portion of a member comprising two portions which extend perpendicularly relative to each other. The first portion is pivotally mounted in the support. A second limb of the spring is connected to the first portion and exerts a force on the dust cover via a second portion which is connected to the dust cover, to keep this cover in an open position after it has been swung open. As a result of the use of a special support, the spring and the screw-mounted member, the hinge device of the known record player comprises a number of parts which require a relatively long mounting time during assembly of the record player and which add considerably to the price of the record player. Moreover, these parts of the hinge device are located so that they project from the exterior of the housing. Thus, the location of these parts results in an increased overall depth of the record player.

SUMMARY OF THE INVENTION

It is the object of the invention to provide a record player of the type specified in the opening paragraph, which is equipped with a hinge device which is simple to mount and cheap and which operates in a satisfactory manner. According to the invention the hinge device comprises a hinge wall and an abutment, which wall and abutment are integral with the housing and are spaced from each other in an end portion of a first limb of the hinge spring, which end portion abuts the abutment, urges turns of the hinge spring coil against the hinge wall. A second limb f the hinge spring projects from a slot formed in the housing adjacent the hinge wall, which slot extends parallel to a plane perpendicular to the hinge axis of the hinge device, and is coupled directly to the dust cover projecting from the housing through the slot.

In this way the two parts of the hinge device, namely the hinge wall and the abutment, can be integrated with the housing. For example, by injection-molding the housing from a plastic material, these parts can be manufactured integrally with the housing, so that the housing with these parts is a one-piece article. Mounting the hinge device only requires mounting the hinge spring in the housing, snapping the end portion of the first limb behind the abutment so that the turns lie against the rear wall, and coupling the second limb to the dust cover coupling is effected preferably by inserting the end portion of the second limb into a slot in the dust cover.

A record player in accordance with a preferred embodiment of the invention is characterized in that the hinge wall is situated near the upper side of the housing and bounds a hinge space in which the turns of the hinge spring are situated, an opening in the bottom of the hinge space communicating with the interior of the housing. The presence of an opening in the hinge wall simplifies mounting of the hinge spring; and the shape of the wall bounding the hinge space retains the turns of the springs.

In this preferred embodiment the hinge wall has a circularly cylindrical shape and is concentric with the hinge axis of the hinge device. This construction provides a correct engagement between the hinge wall and the spring turns, the hinge axis coinciding with the axis through the centers of the spring turns. In this way a simple and cheap hinge device is obtained, which enables the dust cover to be hinged in an accurate manner.

Two embodiments of the invention will now be described in more detail, by way of example, with reference to the drawing.

BRIEF DESCRIPTION OF THE DRAWING

FIG. 1 is a plan view of a record player in accordance with the invention;

FIG. 2 shows a part of the record player shown in FIG. 1 on an enlarged scale with the dust cover in an open position;

FIG. 3 is a sectional view taken on the lines III—III in FIG. 2;

FIG. 4 is a sectional view taken on the lines IV—IV of FIG. 3;

FIG. 5 is a sectional view of a part of a second embodiment of the invention.

DESCRIPTION OF THE PREFERRED EMBODIMENTS

The record player shown in FIG. 1 comprises a housing 1 and a turntable 2 which is mounted on the housing upper side for rotation and which during operation is driven by a motor, not shown. The upper side of the housing also carries a pick-up arm 3, carries a pick-up element 3a at the front and which is pivotable about an axis 4. The upper side of the housing 1 with the turntable 2 and the pick-up arm 3 is covered by means of a dust cover 5.

Near the rear the housing 1 carries two identical hinge devices 6 situated near the corners of the housing. Each hinge device 6 comprises a hinge wall 7 which is formed by a portion of the housing 1 that has a circularly cylindrical shape and which is concentric with the hinge axis 6a of the hinge device 6. Preferably the hinge wall 7 extends between the rear wall 8 of the housing 1 and the upper wall 9. In this way the hinge wall 7 bounds a hinge space 10 which at the bottom communicates with the interior of the housing 1. The hinge wall 7 extends preferably through substantially 270° around the hinge axis 6a, so that as shown in FIG. 4 there is sufficient clearance to fit the turns 11 of a hinge spring 12. Preferably the turns 11 are also arranged concentrically around the hinge axis 6a. The hinge spring 12 further comprises a first limb 13 having a perpendicularly bent end portion 14 which abuts an abutment 15 on the inner side of the rear wall 8 of the housing 1. Both the hinge wall 6 and the abutment 15 are integral with the housing 1. Preferably these two parts are manufactured integrally with the housing 1 by injection-molding. Because of the cooperation of the limb end portion 14 and the abutment 15, in the assembled position the first limb 13 firmly urges the turns 11 against the hinge wall 7, thereby ensuring that the turns occupy the correct position inside the space 10.

The hinge spring 12 also comprises a second limb 16 which also has a right-angled end portion 17. The limb 16 extends through a slot 18, which slot extends parallel to a plane perpendicular to the hinge axis 6a. Thus, the limb 16 extends from the hinge space 10 to the exterior of the housing 1. Near the rear the dust cover 5 comprises two parallel walls 19 and 20 which bound a slot 21. Preferably the clearance between the walls 19 and 20 is selected so as to enable the second limb 16 to be slid into the slot 21 in such a manner that the limb is clamped in position. Thus, the dust cover 5 of the record player in accordance with the invention is pivotally connected to the housing 1 by means of the hinge springs 12 of the hinge devices 6. Preferably, the slot 18 is dimensioned so that the limb 16 abuts the end of the slot 18 in the open position shown in FIGS. 2 to 4. In this position the hinge spring 12 ensures that the dust cover remains positioned correctly. This allows the disc on the turntable 2 to be engaged and/or the pick-up arm 3 to be operated after the dust cover has been hinged open.

The construction of the hinge device 6 in the record player is accordance with the invention has the advantage that two parts of the hinge device are manufactured integrally with the housing. These parts are the hinge wall 7 and the abutment 15. During assembly of the record player only the limb 16 of the hinge spring 12 must be passed through the slot 18 after which the end portion 14 is pushed above and snaps over the abutment 15. At the same time the hinge spring with the turns 11 is mounted in the correct position. Thus, it is ensured that the hinge axis 6a of the hinge device 6 occupies the correct position. Subsequently, the second limb 16 is inserted into the slot 21. Then assembly of the hinge device is completed. In spite of this simple assembly process the user can remove the dust cover 5 from the housing 1 in a simple manner. This is effected by pulling the dust cover upwards, so that the limbs 16 are disengaged from the slots 21.

It is to be noted that the hinge wall 7 is preferably situated so relative to the rear wall 8 that it projects from the housing 1 over a limited distance only. This construction of the hinge device 6 enables the depth of the record player to be minimized.

It is to be noted also that the diameter of the turns 11 increases slightly when the spring 12 relaxes while opening the dust cover 5. This expansion may lead to an increased friction between the turns 11 and the wall 7 at the end of the pivotal movement 1 when the limb 16 approaches the end of the slot 18. Preferably the dust cover is retained in the open position both by the spring force of the limb 16 and this increased friction between the turns 11 and the hinge wall 7. It is important that the construction of the hinge spring and of the other parts of the hinge device 6 and the arrangements of these parts relative to each other are adapted to the relevant dust cover to be hinged. Moreover, it is possible to use different numbers of hinge devices 6, for example three, instead of two as shown.

Instead of the abutment 15 for the end portion 14 as described in the foregoing, it is possible, as is shown in FIG. 5, to form a slot 22 in the wall 8 of the housing, the spring 12 then comprising an outwardly bent end portion 14a, and the wall of the slot functioning as the abutment.

What is claimed is:

1. A record player comprising a housing having an upper side, a rear, and an inner surface; a dust cover; and at least one hinge device defining a hinge axis, and connected to the dust cover and to the housing near the rear, said hinge device including a hinge coil spring arranged such that, when the dust cover is swung to an open position, the dust cover is retained in this position by the hinge spring, characterized in that said hinge device comprises a hinge wall having an inner surface forming part of said housing inner surface, and an abutment, integral with the housing and spaced from said hinge wall inner surface and a slot formed in the housing adjacent the hinge wall, said slot extending parallel to a plane perpendicular to said hinge axis, said housing, hinge wall and abutment are a one-piece article, said spring comprises a first limb having an end portion, and a second limb, and said spring is arranged such that said end portion abuts said abutment so as to urge turns of the coil of the hinge spring against the hinge wall inner surface and thereby retain said spring, said second limb projecting from the housing through the slot and being coupled directly to the dust cover.

2. A record player as claimed in claim 1, characterized in that the hinge wall bounds a hinge space in which the turns of the hinge spring are disposed, said hinge wall being situated near the upper side of the housing; and the hinge space communicates with the interior of the housing through an opening in the bottom of the hinge space.

3. A record player as claimed in claim 2, characterized in that the hinge wall has a circular cylindrical shape concentric with said hinge axis.

4. A record player as claimed in claim 3, characterized in that said abutment is a wall formed on the inner surface of the housing.

5. A record player as claimed in claim 2, characterized in that said abutment is a wall formed on the inner surface of the housing.

6. A record player as claimed in claim 1, characterized in that said abutment is a wall formed on the inner surface of the housing.

7. A record player as claimed in claim 3, characterized in that said housing has an abutment slot, said abutment being formed by a wall of the slot, said spring end portion extending into said abutment slot.

8. A record player as claimed in claim 2, characterized in that said housing has an abutment slot, said abutment being formed by a wall of the slot, said spring end portion extending into said abutment slot.

9. A record player as claimed in claim 1, characterized in that said housing has an abutment slot, said abutment being formed by a wall of the slot, said spring end portion extending into said abutment slot.

10. A record player comprising a housing, a dust cover, and a hinge-and-spring means for connecting the dust cover to the housing, characterized in that said means consists of a hinge wall defining a hinge axis and having an inner surface, an abutment, a coil spring, and means for connecting the cover to the coil spring, said housing, hinge wall and abutment are a one-piece article, having a slot therethrough adjacent to the hinge wall and extending parallel to a plane perpendicular to said axis, said spring comprises a coil portion, a first limb having an end portion, and a second limb, and said spring and article are so arranged that said hinge wall defines a hinge space; said coil portion is retained in said hinge space by engagement of said spring end portion with said abutment, said engagement urging the coil portion against said inner surface; and said limb projects from the housing through said slot for connection to the cover.

11. A record player as claimed in claim 10, wherein said means for connecting consists of engagement of said second limb in a slot formed in the dust cover.

* * * * *